(12) United States Patent
Yeh et al.

(10) Patent No.: US 6,691,224 B1
(45) Date of Patent: Feb. 10, 2004

(54) COMPUTER SYSTEM FOR ACCESSING INITIALIZATION DATA AND METHOD THEREFOR

(75) Inventors: Bi-Yun Yeh, Taipei (TW); Shu-Tzu Wang, Taipei (TW); Heng-Chen Ho, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 09/481,714

(22) Filed: Jan. 12, 2000

(30) Foreign Application Priority Data

Jun. 14, 1999 (TW) ........................ 88109868 A

(51) Int. Cl.⁷ .............................. G06F 9/00; G06F 9/24
(52) U.S. Cl. .............................................. 713/2; 711/5
(58) Field of Search ...................... 711/156, 5; 713/112

(56) References Cited

U.S. PATENT DOCUMENTS

| | | | | | |
|---|---|---|---|---|---|
| 4,213,182 A | * | 7/1980 | Eichelberger et al. | ...... | 700/296 |
| 5,375,161 A | * | 12/1994 | Fuller et al. | ................ | 455/417 |
| 5,592,675 A | * | 1/1997 | Itoh et al. | .................. | 365/222 |
| 5,936,526 A | * | 8/1999 | Klein | ......................... | 340/571 |
| 5,937,434 A | * | 8/1999 | Hasbun et al. | .............. | 711/156 |
| 6,014,760 A | * | 1/2000 | Silva et al. | .................... | 705/8 |
| 6,022,274 A | * | 2/2000 | Takeda et al. | ................. | 463/44 |
| 6,253,276 B1 | * | 6/2001 | Jeddeloh | ........................ | 711/5 |
| 6,405,311 B1 | * | 6/2002 | Broyles et al. | ................ | 713/2 |
| 6,473,857 B1 | * | 10/2002 | Panas et al. | ................... | 713/2 |
| 6,530,031 B1 | * | 3/2003 | Randall et al. | ............. | 713/502 |
| 6,571,333 B1 | * | 5/2003 | Jain et al. | ....................... | 713/2 |

* cited by examiner

*Primary Examiner*—Thomas Lee
*Assistant Examiner*—Mark Connolly
(74) *Attorney, Agent, or Firm*—Rabin & Berdo, P.C.

(57) ABSTRACT

A method and computer system for accessing initialization data stored in a boot ROM's memory space which is not used by a BIOS contained in the boot ROM. After the power supply starts up, the south bridge starts up and sends an initiating signal to the north bridge for starting up the north bridge. Once the north bridge has started up, it sends the south bridge a transaction which requests that the south bridge reads the initialization data from the boot ROM and sends the initialization data to the south bridge. Then, the CPU starts up and operates normally after the CPU receives an initiating signal and the initialization data sent by the north bridge.

33 Claims, 4 Drawing Sheets

COMPUTER SYSTEM FOR ACCESSING INITIALIZATION DATA AND METHOD THEREFOR

BACKGROUND OF THE INVENTION

This application incorporates by reference Taiwanese application Serial No. 88109868, Filed Jun. 14, 1999.

1. Field of the Invention

The invention relates to the field of computer systems. More specifically, the invention relates to the art of accessing initialization data stored in a non-volatile memory, such as an Electrically Erasable Programmable Read-Only Memory (EEPROM), of a computer system.

2. Description of the Related Art

As electronic and information technology progress rapidly, more powerful, high performance and innovative peripherals for Personal Computer (PC) are available to the market. While functionality of peripherals becomes more complicated, PC vendors tend to design PC with simpler architecture in order to have simpler circuit layout and lower cost. Therefore, the chipset, which integrates separated logic for different functions into one chip, is designed to make the PC architecture meet this requirement. Nowadays, most PCs are designed with using chipsets simplifying PCs' layout as well as making space on the main board or mother board of PC for further usage.

Referring now to FIG. 1, a conventional personal computer system is shown with components, including so-called "north bridge" and "south bridge" chipsets, in block diagram form. The various components and buses are typically formed on a main board or mother board, which are well known. A personal computer system typically contains one central processing unit (CPU) 104, cache memory 106 and Dynamic Random Access Memory (DRAM) 108. The CPU 104, cache memory 106 and DRAM 108 are connected to a north bridge 102. A power supply controller 112, keyboard/mouse 114 and a boot Read-Only Memory (ROM) 116, which stores a basic input/output system (BIOS) are connected to the south bridge 110. The peripheral bus 100, such as the conventional Peripheral Component Interconnect (PCI) bus, which a number of peripherals that meet the PCI specification can be connected to, is connected to both the south bridge 110 and north bridge 102. Both the north bridge 102 and the south bridge 110 connect to and/or control the devices or peripherals working with different bandwidth and performance requirements. The north bridge 102 is designed closer to the CPU 104 so that it is used to connect to the components and/or peripherals with high bandwidth and system performance requirements, such as component DRAM 108. On the other hand, the south bridge 110 is utilized to connect lower bandwidth required peripherals such as the keyboard/mouse 114.

During conventional computer system booting procedure, the CPU sets its initial values with specific data transferred through the north bridge and south bridge for initialization. The data for setting the initial values in the beginning of booting are called the initialization data. The initialization data are not included in the BIOS which is stored in the boot ROM, and they depend on the CPU that a computer system adopted. For example, the "SIP" data are the initialization data used in PCs using CPUs manufactured by Advanced Micro Devices (AMD) incorporation.

For these reasons, two conventional approaches, namely, strapping and jumping are used to set the initialization data. Strapping refers to using fixed connections of circuit to set the data, while jumping means using jumpers for a user to short two pins from a set of pins for data setting. If a few numbers of initialization data are to be set, it is suitable to set these data through hardware connections such as strapping and jumping. However, costs of applying these two approaches will increase when more initialization data are necessary to be set.

Referring now to FIG. 2, a conventional computer system designed by AMD incorporation is shown in block diagram form. In this design, a serial Programmable Read-Only Memory (serial PROM) 200 is included in the computer system and is utilized to store the initialization data mentioned above. The initialization data for this computer system take up about 34-byte memory space of the serial PROM. By this approach, a number of strapping and jumping for setting the initialization data are omitted.

In FIG. 2, a serial PROM 200 is connected to the north bridge 204 by the two input/output ports 202 of the north bridge 204. When the computer system is powered on, the south bridge 206 is powered and sends a signal to start up the north bridge 204. After the north bridge 204 has started up, it sends a clock-like signal to the serial PROM 200 and then reads the initialization data stored in the serial PROM 200. Finally, the CPU 208 starts up and then operates normally after the CPU 208 sets its initial values for initialization using the initialization data sent by the north bridge 204.

The computer system illustrated by FIG. 2 overcomes the drawback of applying strapping or jumping approaches to setting initialization data in the conventional computer system. However, when it comes to mass production, this approach is not efficient with regard to the production cost because of using the serial PROM, adding ports and logic for connecting the serial PROM, and making modification on the north bridge.

SUMMARY OF THE INVENTION

It is therefore an object of the invention to provide a computer system and method for accessing initialization data in the computer system without using serial PROM to store the initialization data.

The above object of the invention is achieved by a method for accessing initialization data stored in the boot ROM's memory space not used by a BIOS contained in a boot ROM of a computer system, including the following steps. First, the power controller of the computer system starts up a south bridge chipset. Next, a first signal is generated by the south bridge chipset in order to start up a north bridge chipset. Then, a second signal is generated by the north bridge chipset in order to request the south bridge chipset to read the initialization data from the boot ROM and to send the initialization data to the north bridge chipset. After that, a third signal is sent from the north bridge chipset in order to start up a processor and send the initialization data to the processor.

The above object of the invention is also achieved by a computer system including a south bridge chipset, a boot ROM, a north bridge and a central processing unit (CPU). The computer system accesses initialization data stored in the boot ROM's memory space not used by a BIOS contained in the boot ROM. The south bridge chipset generates a first signal after the south bridge chipset is powered. The north bridge chipset receives the first signal, starts up, and then generates a second signal in order to request the south bridge chipset to read the initialization data and to send the initialization data to the north bridge chipset. The central processing unit (CPU) receives a third signal generated by the north bridge chipset and then starts up. After CPU has started up, the north bridge chipset sends the initialization data to the CPU.

The feature of the invention therefore is storing the initialization data in the boot ROM's memory space not used by the BIOS contained in the boot ROM of a conventional computer system. By using this approach, it is no longer necessary to adopt any additional ROM for storing the initialization data and to use additional input/output ports provided in the north and/or south bridge. As a result, the production cost is effectively reduced.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
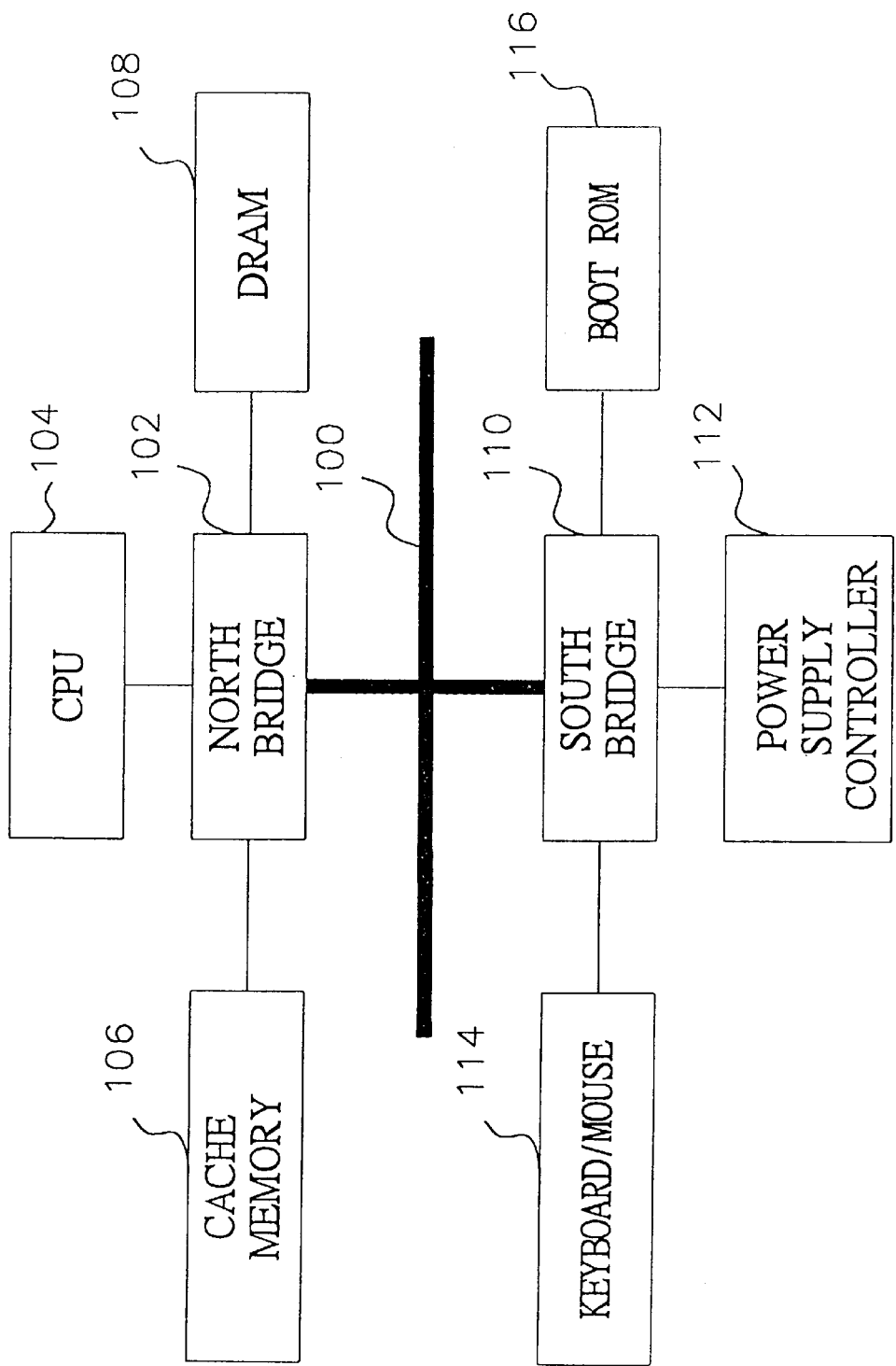
FIG. 1 is a block diagram of the conventional computer system.
Figure 2:
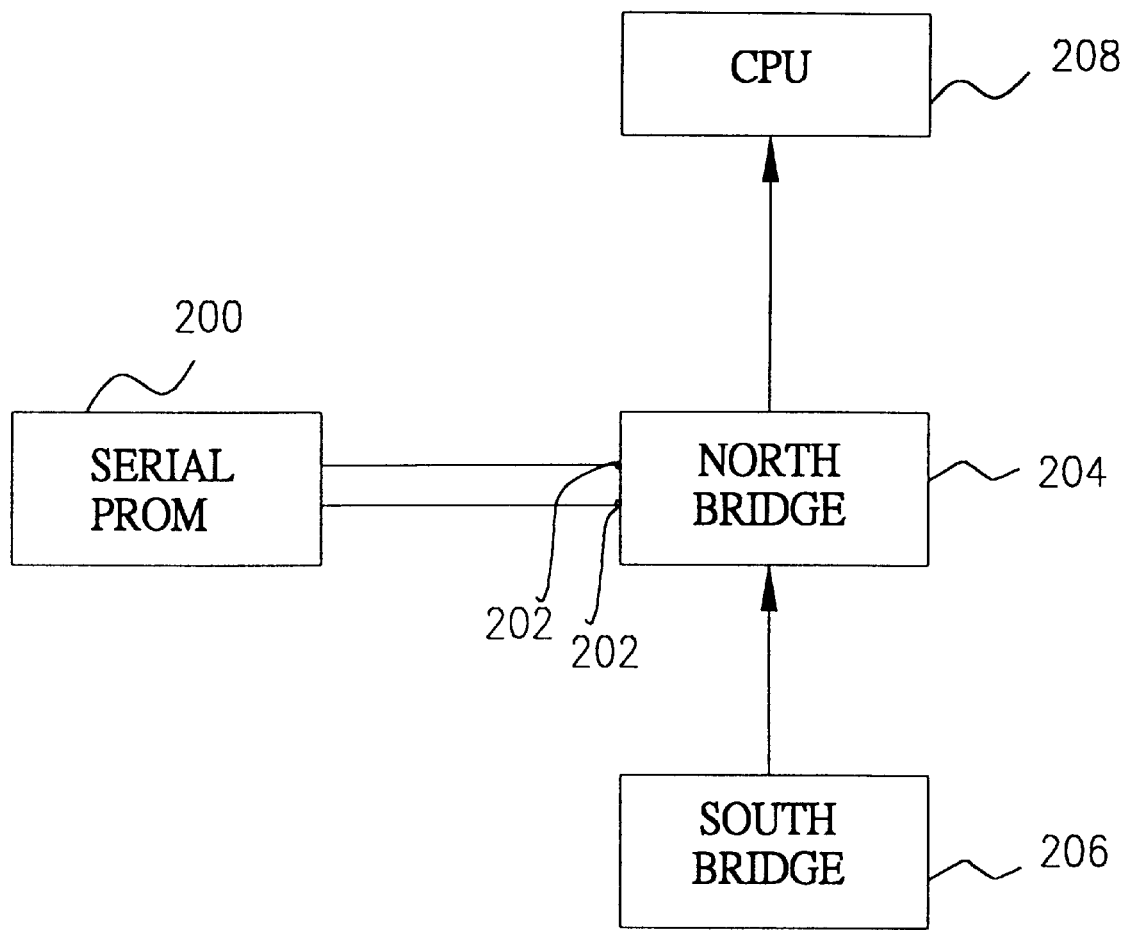
FIG. 2 is a block diagram of the conventional computer system for accessing initialization data.
Figure 3:
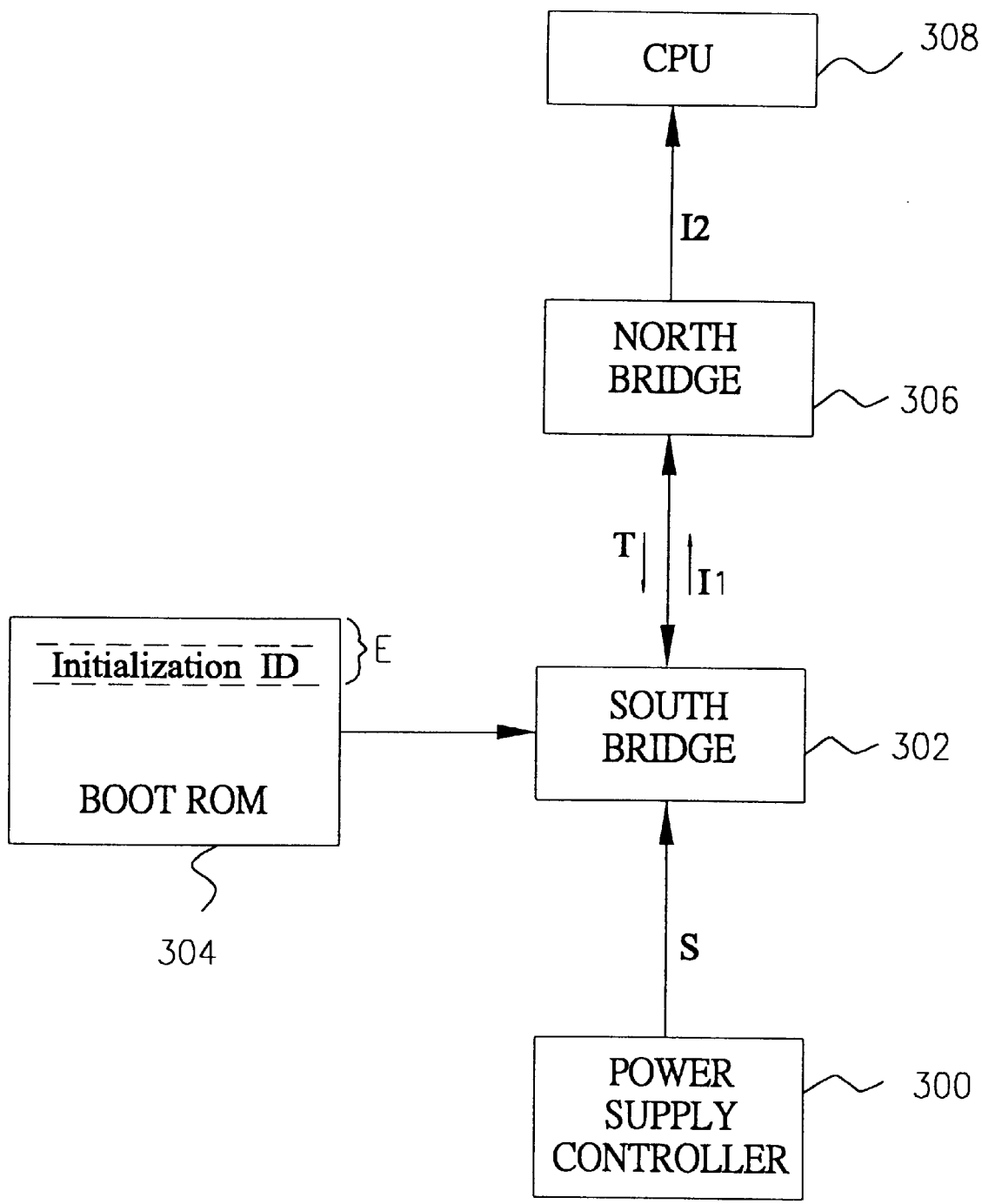
FIG. 3 is a diagram of a computer system in accordance with a preferred embodiment of the invention.

Referring first to FIG. 3, a computer system in accordance with the preferred embodiment of the invention is shown in block diagram form. This computer system includes a power supply controller 300, a south bridge 302, a boot ROM 304, a north bridge 306 and a CPU 308, coupled to each other as shown. When the computer system boots up, it firstly starts up the power supply of the computer system (not shown in the figure) by using the power supply controller 300. Then, after the south bridge 302 is powered by power S provided by the power supply controller 300, the south bridge 302 starts up and sends an initiating signal 11 to the north bridge 306. After receiving the initiating signal 11 and starting up, the north bridge 306 sends a transaction T to the south bridge 302. The transaction T requests that the south bridge 302 reads the initialization ID stored in the boot ROM 304 and then sends the initialization ID to the north bridge 306. Once the north bridge 306 receives this ID, it sends an initiating signal 12 to the CPU 308. Then, after receiving the initiating signal 12, the CPU 308 starts up. After the CPU 308 receives the initialization ID sent by the north bridge 306, the process of initialization of the CPU is completed.

The boot ROM 304 is a non-volatile memory that contains the BIOS. The non-volatile memory such as Erasable Programmable Read-Only Memory (EPROM), EEPROM and flash memory is usually used as the boot ROM. BIOS is the system of initialization code and interrupt service routines for the computer system's associated devices. The initialization code is for the first access of the processor of the computer system and is then used to test and initialize other devices of the computer system such as main memory, floppy disk drives and hard disk drives, and then allow other programs such as operating systems, etc., to begin execution. The boot ROM generally contains a memory space E of tens of bytes that is not used by the BIOS. It is enough to store the initialization data, such as the initialization ID and the 34-byte "SIP" data mentioned above.

Figure 4:
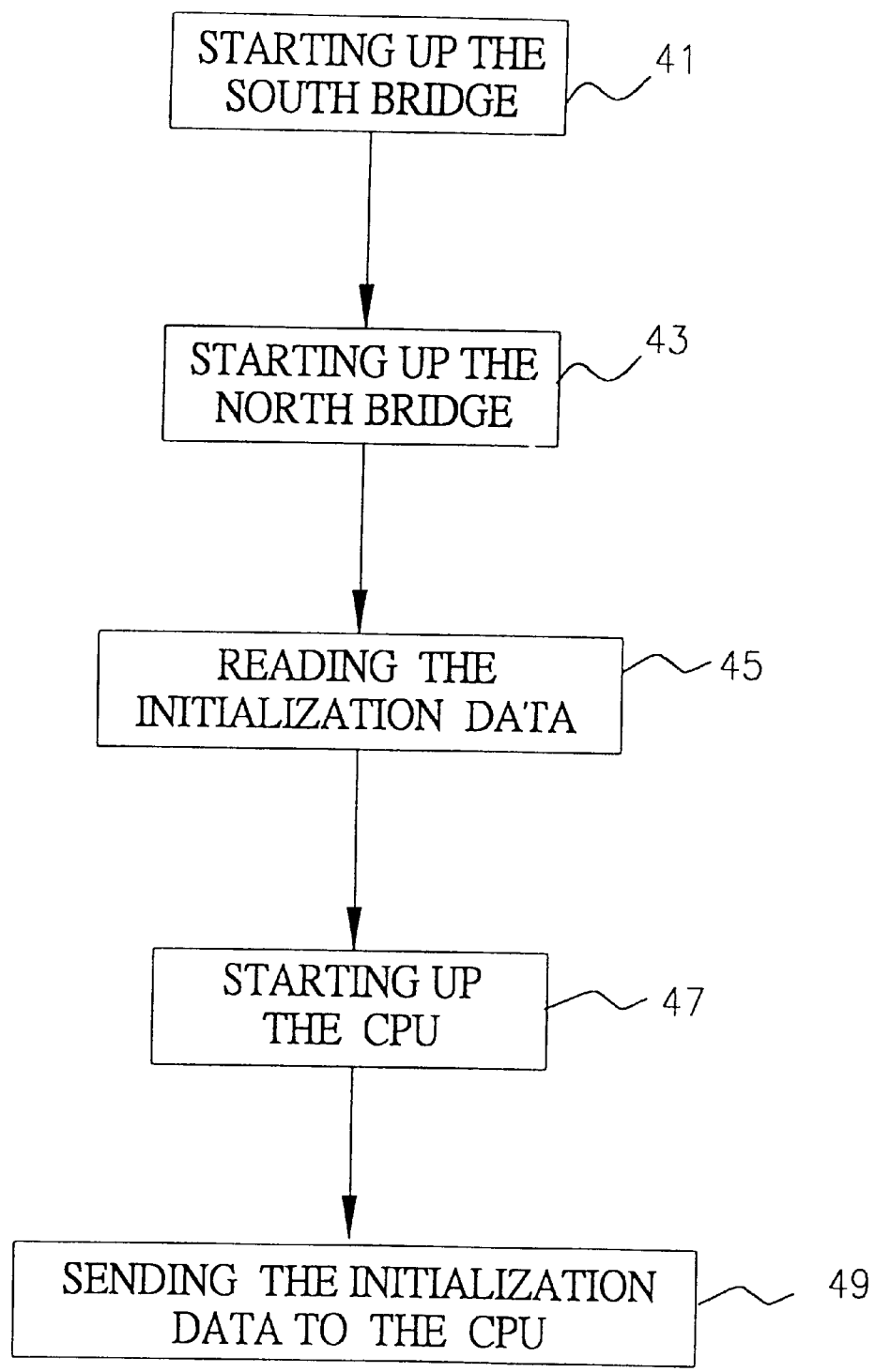
FIG. 4 is a flowchart of the initialization of a computer system in accordance with the preferred embodiment of the invention.

Referring to FIG. 4, a method for accessing initialization data in accordance with the preferred embodiment of the invention is shown in flowchart form. Firstly, as shown in step 41, the south bridge is started up right after the power supply is started up. Then, as shown in step 43, an initiating signal is sent by the south bridge to trigger the north bridge starting up. Next, the north bridge sends transaction T to the south bridge after the north bridge starts up. As shown in step 45, the transaction T is sent for requesting the south bridge to read the initialization data stored in the boot ROM's memory space which the BIOS does not use. Then, as shown in step 47, the north bridge triggers the CPU starting up. After that, as shown in 49, the north bridge sends the initialization data to the CPU for setting its initial values.

Therefore, the feature of the invention is storing the initialization data in the boot ROM's memory space not used by the BIOS contained in the boot ROM. The boot ROM is a non-volatile memory such as EPROM, EEPROM or flash memory that contains a BIOS in a conventional computer system. By using this approach, it is no longer necessary to adopt any additional ROM for storing the initialization data and to use additional input/output ports provided in the north and/or south bridge. As a result, the production cost is effectively reduced.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for accessing initialization data in a computer system, comprising the steps of:

starting up a north bridge chipset;

sending a first signal from the north bridge chipset, wherein the first signal requests a south bridge chipset to read said initialization data from a boot Read-Only Memory (ROM) and then to send said initialization data to the north bridge chipset; and sending a second signal from the north bridge chipset to a processor for starting up the processor followed by sending said initialization data to the processor from the north bridge chipset.

2. A method according to claim 1, wherein said initialization data are about 34 bytes.

3. A method according to claim 1, wherein said boot ROM is a non-volatile memory.

4. A method according to claim 3, wherein said boot ROM comprises a BIOS, which is the system of initialization code and interrupt service routines for the computer system's associated devices.

5. A method according to claim 4, wherein said boot ROM comprises a memory space not used by said BIOS and said initialization data are stored in said memory space not used by said BIOS.

6. The method according to claim 1, wherein said initialization data include one of an initialization ID and "SIP" data.

7. A method of accessing initialization data of a computer system, comprising the steps of:

starting up a south bridge chipset;

generating a first signal by said south bridge chipset in order to start up a north bridge chipset;

generating a second signal by said north bridge chipset in order to request said south bridge chipset to read said initialization data from a boot ROM and to send said initialization data to said north bridge chipset; and generating a third signal from said north bridge chipset in order to start up a processor followed by sending said initialization data to said processor.

8. A method according to claim 7, wherein said boot ROM is a non-volatile memory.

9. A method according to claim 7, wherein said boot ROM comprises a BIOS, which is the system of initialization code and interrupt service routines for the computer system's associated devices.

10. A method according to claim 9, wherein said boot ROM comprises a memory space not used by said BIOS and said initialization data are stored in said memory space not used by said BIOS.

11. A method according to claim 7, wherein said south bridge chipset is started up by a power supply controller.

12. A method according to claim 7, wherein said initialization data are about 34 bytes.

13. The method according to claim 7, wherein said initialization data include one of an initialization ID and "SIP" data.

14. A computer system for accessing initialization data, which comprises:

a south bridge chipset which generates a first signal after the south bridge chipset is started up;

a boot ROM which stores said initialization data;

a north bridge chipset which receives the first signal, starts up and then generates a second signal in order to request said south bridge chipset to read said initialization data; and a central processing unit (CPU) which receives a third signal generated by said north bridge chipset and then starts up;

wherein said north bridge chipset requests said south bridge chipset to read said initialization data and to send said initialization data to said north bridge chipset; when said CPU has started up, said north bridge chipset sends said initialization data to said CPU;

wherein said initialization data depend on the processor.

15. A computer system according to claim 14, wherein said boot ROM is a non-volatile memory.

16. A computer system according to claim 14, wherein said boot ROM comprises a BIOS, which is the system of initialization code and interrupt service routines for the computer system's associated devices.

17. A computer system according to claim 16, wherein said boot ROM comprises a memory space not used by said BIOS and said initialization data are stored in said memory space not used by said BIOS.

18. A computer system according to claim 14, wherein said initialization data takes up about 34 bytes of the memory space.

19. A computer system according to claim 14, wherein said initialization data are SIP data used by processors produced by Advanced Micro Devices incorporation.

20. The computer system according to claim 14, wherein said initialization data include one of an initialization ID and "SIP" data.

21. A method for accessing initialization data in a computer system, comprising the steps of:

starting up a first agent;

loading said initialization data from a boot Read-Only-Memory (ROM) to said first agent; and sending said initialization data to a second agent for starting up.

22. The method according to claim 21, wherein said first agent comprises a north bridge chipset in said computer system.

23. The method according to claim 21, wherein said first agent comprises a north bridge chipset and a south bridge chipset in said computer system.

24. The method according to claim 21, wherein said second agent comprises a processor in said computer system.

25. The method according to claim 21, wherein said second agent comprises a processor and a north bridge chipset in said computer system; said first agent comprises a south bridge chipset in said computer systems.

26. The method according to claim 21, wherein said first agent sends said first signal to a third agent to read said initialization data from a boot Read-Only-Memory (ROM).

27. The method according to claim 26, wherein said first agent comprises a north bridge chipset.

28. The method according to claim 26, wherein said third agent comprises a south bridge chipset.

29. The method according to claim 21, wherein said initialization data are about 34 bytes.

30. The method according to claim 21, wherein said boot ROM is a non-volatile memory.

31. The method according to claim 30, wherein said boot ROM comprises a BIOS, which is the system of initialization code and interrupt service routines for the computer system's associated devices.

32. The method according to claim 31, wherein said boot ROM comprises a memory space not used by said BIOS and said initialization data are stored in said memory space not used by said BIOS.

33. The method according to claim 21, wherein said initialization data include one of an initialization ID and "SIP" data.

* * * * *